J. L. BERNARD.
NUT OR CLAMP.
APPLICATION FILED SEPT. 19, 1907.
968,112.
Patented Aug. 23, 1910.
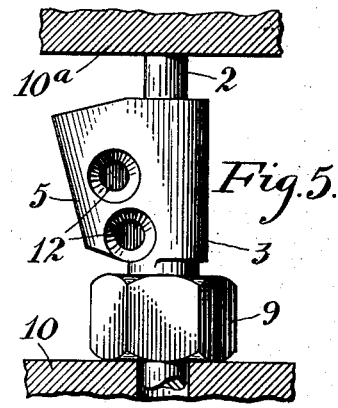
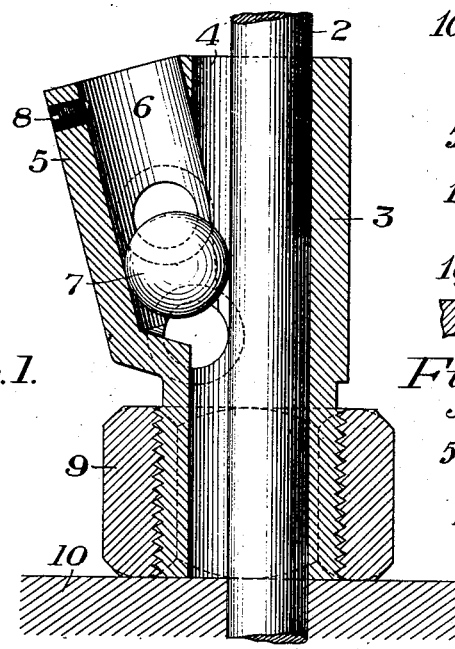
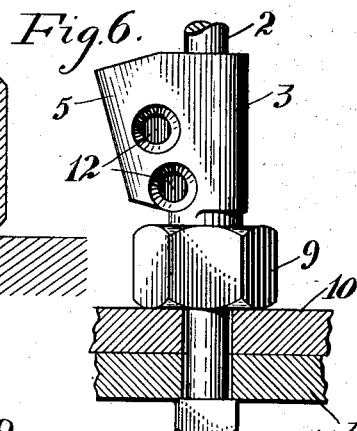
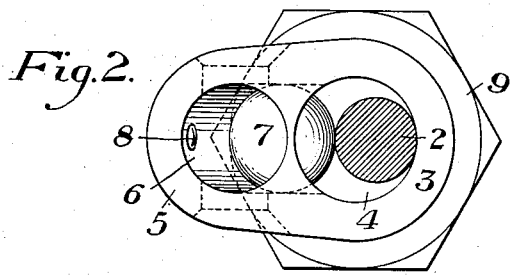
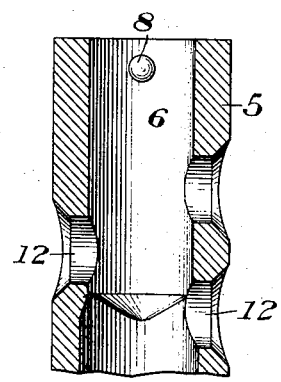
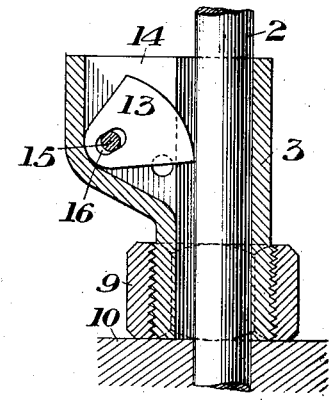
WITNESSES
INVENTOR
Jas. L. Bernard,
by Bakewell, Byrnes & Parmelee,
his Attys.

UNITED STATES PATENT OFFICE.

JAMES L. BERNARD, OF AMBRIDGE, PENNSYLVANIA.

NUT OR CLAMP.

968,112.  Specification of Letters Patent.  Patented Aug. 23, 1910.

Application filed September 19, 1907. Serial No. 393,752.

*To all whom it may concern:*

Be it known that I, JAMES L. BERNARD, of Ambridge, Beaver county, Pennsylvania, have invented a new and useful Nut or Clamp, of which the following is a full, clear, and exact description, reference being had to the accompanying drawings, forming part of this specification.

My invention relates to apparatus used in stitching or temporarily securing a plurality of members together while the members of the fabricated structure are being permanently secured together.

The object of my invention is to provide a nut or clamp of simple construction, which can be readily applied to a bolt or rod for the purpose of securing the latter without threads.

Figure 1 is a sectional view of a nut or clamp embodying my invention; Fig. 2 is an end view of the same; Fig. 3 is a detail sectional view through a portion of the clamp sleeve; Fig. 4 is a sectional view showing a modification; Fig. 5 is a side elevation showing one way of using my improved clamp; Fig. 6 is a similar view showing another way of applying my clamp for use.

Referring to the accompanying drawings, the numeral 2 designates a portion of a bolt or rod to be clamped.

3 is a sleeve having an opening or bore 4 of larger diameter than the diameter of the rod or bolt, and also having at one end a lateral extension 5 through which leads an oblique bore or opening 6, which intersects the bore or opening 4 through the main portion of the sleeve.

7 is a ball or roller which is dropped loosely into the opening 6 and is held from falling out of it by a set screw 8, or other suitable retaining device. The lower portion of the sleeve 3 is of cylindrical form, and is exteriorly threaded to receive a nut 9.

In using the clamp, a sleeve is slipped over the end of the rod or bolt, the roller or ball contacting with the rod and sleeve in the manner shown in Fig. 1. The sleeve is moved forwardly on the rod 2 until the face of the nut 9 is in engagement with one of the members 10, which is to be clamped. The nut 9 is then backed off, or partly unscrewed from the threaded portion of the sleeve through which the bolt or nut extends sufficiently to move the sleeve 3 and rod 2 relative to the bearing surface 10 to securely clamp the members of the fabricated structure together. In the beginning of the backing off movement of the nut the ball 7 is tightly wedged against the rod 2 in the sleeve 3 so as to securely clamp the sleeve on the rod or bolt. To release the clamp a sliver bar or other pointed tool may be inserted through one of the openings or holes 12 in the offset portion of the sleeve, and the ball or roller pried or lifted out of clamping engagement. This will release the rod or bolt without any adjustment of the nut 9. The device forms a quick-acting nut or clamp, which is adjustable to rods or bolts of different sizes, as the ball or roller will adjust itself in the opening 6 to clamp rods or bolts of varying sizes. The rod or bolt may be of round, square or other desired section, the clamping action being equally effective in all cases.

In using a clamp as shown in Fig. 5 the end of the bolt or rod 2 is held in engagement with the part 10ª while the clamp is moved longitudinally on the rod or bolt 2 until the nut 9 is in engagement with the part 10 to be held in position. The ball 7 will fall by gravity or it can be moved in its recess until it is in engagement with the rod 2. The nut 9 is then screwed outwardly upon the sleeve 3 so as to first tightly wedge the clamp on the bolt 2 and then move and hold the part 10 in position.

In applying my improved clamp for use as shown in Fig. 6, the nut 2 is provided with a bolt head on one end and the bolt is threaded through openings in the parts 10, 10ᵇ which are to be temporarily secured together. The clamp is then moved longitudinally on the bolt 2 until the nut 9 is in engagement with one face of the part 10. As the ball 7 has been moved so as to be in contact with the bolt 2 the rod 9 is turned on the sleeve 3 so as to draw the parts 10 and 10ᵇ tightly together and hold them in this position until after they had been permanently secured together through other openings in these parts.

In the modification shown in Fig. 4, the ball or roller is replaced by a cam-member 13, which is secured in the offset chamber or pocket 14 by a pin 15, which passes loosely through a slot 16 in said member. By turning the nut 9 in a backing-off direction, the sleeve member 3 is raised, and the pin 15 will first act on the member 13 to cause it to securely bite the rod 2 and then move the rod and sleeve relative to the bearing surface 10.

Various changes may be made in the details of construction and arrangement without departing from the spirit and scope of my invention. The clamp may have a split sleeve member extending into a tapering socket or recess in one end portion of the clamp, and other changes may be made.

I claim:

1. In a clamping device a sleeve member, a clamping member within the sleeve member and arranged to clamp a part passing through the sleeve member, said sleeve member having an extension exteriorly threaded, a nut thereon which can be operated to effect a movement of the clamping member to cause the gripping engagement of the clamping member; substantially as described.

2. In a clamping device a sleeve member having an exteriorly threaded portion at one end, an automatic gripping device in the sleeve arranged to grip a member within the sleeve upon relative movement thereof in one direction, and a nut threaded upon the exteriorly threaded portion of the sleeve; substantially as described.

3. In a clamping device a sleeve member threaded at one end and provided with an offset chamber communicating with the bore of the sleeve, a gripping member located in the chamber and capable of projecting into the sleeve, there being an opening in the wall of the chamber to permit insertion of a releasing tool and a nut fitted to the threaded portion of the sleeve and capable of being projected beyond the sleeve; substantially as described.

4. A clamping device comprising a sleeve member open at opposite ends and having one end threaded, an automatic gripping device in the sleeve arranged to grip a member within the sleeve upon relative movement thereof in one direction and a nut fitted to the threaded portion of the sleeve and capable of being projected beyond the sleeve; substantially as described.

5. In a clamping device a sleeve member, a clamping member within the sleeve member arranged to grip a part passing through the sleeve member and means carried by and arranged to be projected beyond the end of the sleeve to force the sleeve backwardly; substantially as described.

In testimony whereof, I have hereunto set my hand.

JAS. L. BERNARD.

Witnesses:
　ARTHUR P. HUME,
　LEE C. JONES.